United States Patent
Jain et al.

(10) Patent No.: US 10,661,972 B2
(45) Date of Patent: May 26, 2020

(54) GRANULE DISPENSER

(71) Applicant: 6D Bytes Inc., Sunnyvale, CA (US)

(72) Inventors: Vipin Jain, Saratoga, CA (US); Venkateswaran Ayalur, Cupertino, CA (US); Vijayasimha Doddabalapur, Foster City, CA (US)

(73) Assignee: 6D Bytes, Inc., Sunnyvale, CA (US)

( * ) Notice: Subject to any disclaimer, the term of this patent is extended or adjusted under 35 U.S.C. 154(b) by 0 days.

(21) Appl. No.: 16/051,101

(22) Filed: Jul. 31, 2018

(65) Prior Publication Data

US 2019/0308796 A1 Oct. 10, 2019

(51) Int. Cl.
| | |
|---|---|
| *B65D 83/06* | (2006.01) |
| *B65D 25/38* | (2006.01) |
| *G01F 11/26* | (2006.01) |
| *B65D 47/04* | (2006.01) |
| *B25J 9/00* | (2006.01) |
| *B25J 11/00* | (2006.01) |
| *B25J 15/06* | (2006.01) |
| *A47F 1/035* | (2006.01) |

(Continued)

(52) U.S. Cl.
CPC .............. *B65D 83/06* (2013.01); *A47F 1/035* (2013.01); *A47J 43/0722* (2013.01); *B25J 9/0096* (2013.01); *B25J 9/161* (2013.01); *B25J 9/1602* (2013.01); *B25J 9/1661* (2013.01); *B25J 11/0045* (2013.01); *B25J 13/006* (2013.01); *B25J 15/0608* (2013.01); *B65D 25/38* (2013.01); *B65D 47/04* (2013.01); *B65G 65/4881* (2013.01); *G01F 11/261* (2013.01); *G01G 13/026* (2013.01); *G05B 19/4147* (2013.01); *G06F 40/30* (2020.01); *A47G 19/34* (2013.01); *B65G 3/04* (2013.01); *B67D 1/0041* (2013.01); *B67D 2210/00076* (2013.01); *B67D 2210/00144* (2013.01); *G05B 2219/40* (2013.01)

(58) Field of Classification Search
CPC ........ B65D 83/06; B65D 25/38; B65D 47/04; G01F 11/26; A47G 19/34
See application file for complete search history.

(56) References Cited

U.S. PATENT DOCUMENTS

| | | | | |
|---|---|---|---|---|
| 2,508,939 | A | * | 5/1950 | De Swart ............... B65D 39/04 222/196 |
| 3,893,599 | A | * | 7/1975 | Birell ..................... B65D 47/00 222/518 |

(Continued)

OTHER PUBLICATIONS

International Search Report and Written Opinion dated Jun. 14, 2019 for PCT/US2019/025421, 8 pages.

*Primary Examiner* — J C Jacyna
(74) *Attorney, Agent, or Firm* — Fountainhead Law Group P.C.

(57) ABSTRACT

In one embodiment, the present disclosure includes a granule dispenser comprising a container for holding granulated components, a cap coupled to a bottom of said container, and a stopper. The stopper may be spring loaded against the ridge of said cap. An interface between the stopper and the cap comprises a plurality of protrusions and a plurality of sawtooth forms, wherein the protrusions mate to a base portion between the sawtooth forms in a first position to form a seal between the cap and the stopper, and wherein, when the stopper is rotated, the protrusions engage a sloped portion of the sawtooth forms to create a plurality of openings between the cap and the stopper.

16 Claims, 10 Drawing Sheets

(51) Int. Cl.
  *B65G 65/48*     (2006.01)
  *G01G 13/02*     (2006.01)
  *A47J 43/07*     (2006.01)
  *B25J 9/16*      (2006.01)
  *G05B 19/414*    (2006.01)
  *B25J 13/00*     (2006.01)
  *G06F 40/30*     (2020.01)
  *A47G 19/34*     (2006.01)
  *B67D 1/00*      (2006.01)
  *B65G 3/04*      (2006.01)

(56) References Cited

U.S. PATENT DOCUMENTS

| | | | |
|---|---|---|---|
| 4,084,726 A * | 4/1978 | Nicol | A01C 7/02 |
| | | | 111/96 |
| 4,286,737 A * | 9/1981 | Gallant | B65D 83/06 |
| | | | 222/470 |
| 2005/0029154 A1 * | 2/2005 | Kahn | A61J 7/0076 |
| | | | 206/540 |
| 2007/0187433 A1 * | 8/2007 | Webster | B65D 83/06 |
| | | | 222/370 |
| 2009/0180843 A1 | 7/2009 | Jackson et al. | |
| 2011/0018406 A1 | 1/2011 | Hartsfield, Jr. et al. | |
| 2015/0114236 A1 | 4/2015 | Roy et al. | |
| 2015/0290795 A1 | 10/2015 | Oleynik | |
| 2017/0217664 A1 * | 8/2017 | Burger | B65D 83/0409 |
| 2017/0221296 A1 | 8/2017 | Jain et al. | |

* cited by examiner

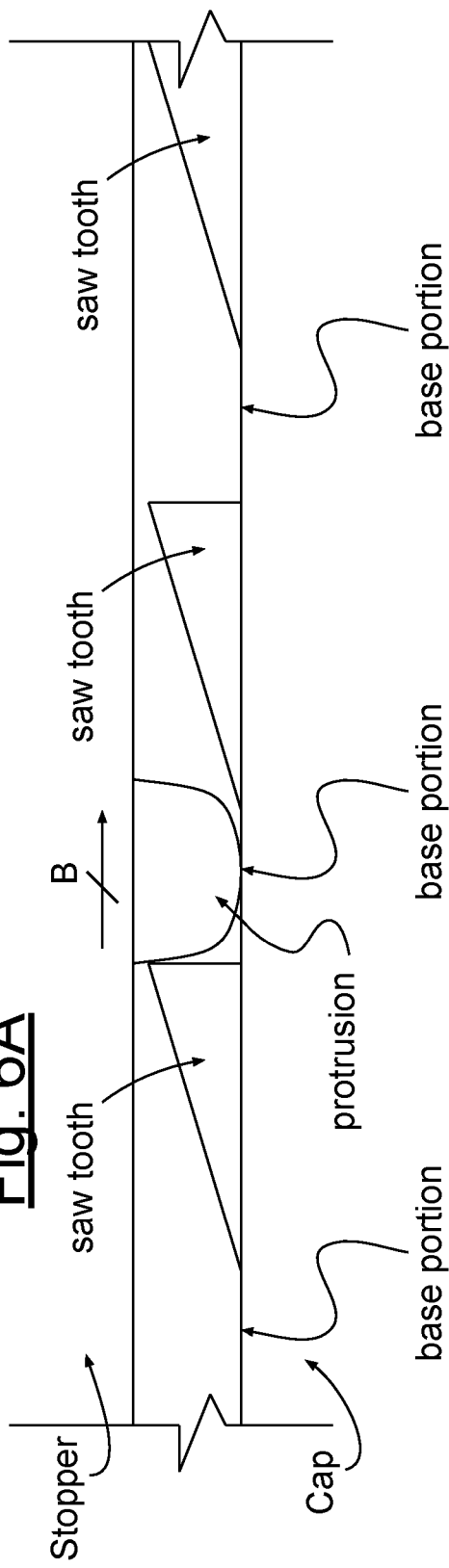
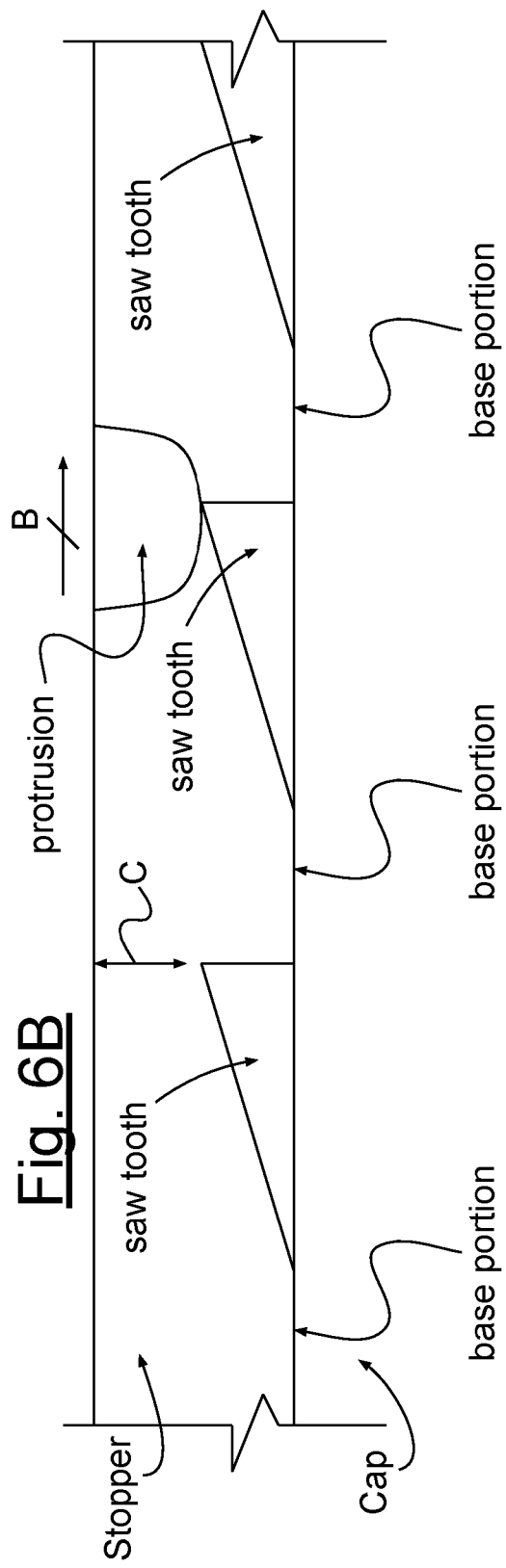

US 10,661,972 B2

GRANULE DISPENSER

CROSS REFERENCE TO RELATED APPLICATIONS

This application claims the benefit of priority to U.S. Provisional Patent Application No. 62/652,740, filed Apr. 4, 2018, the entire contents of which are incorporated herein by reference.

BACKGROUND

The present disclosure relates to apparatuses, systems, and methods of dispensing, and in some embodiments, to a computer controlled granule dispenser for an automated robotic system.

Dispensers are typically used to store and deliver items. One challenge with creating a reliable dispenser is the ability to control the amount of material that is delivered. This is particularly challenging when the material is food, for example, such as solid chucks of fruits. Another challenge with creating a reliable dispenser is that the materials cannot get stuck inside the system. For automated delivery systems, ensuring that there are no jams and that repeatable quantities of materials can be delivered reliably may be paramount.

The present disclosure introduces a granule dispenser mechanism that may be used to reliably deliver repeatable quantities of granulated items, such as powdered or similarly granulated food items.

SUMMARY

In one embodiment, the present disclosure includes a granule dispenser comprising a container for holding granulated components, a cap coupled to a bottom of said container, and a stopper. The stopper may be spring loaded against the ridge of said cap. An interface between the stopper and the cap comprises a plurality of protrusions and a plurality of sawtooth forms, wherein the protrusions mate to a base portion between the sawtooth forms in a first position to form a seal between the cap and the stopper, and wherein, when the stopper is rotated, the protrusions engage a sloped portion of the sawtooth forms to create a plurality of openings between the cap and the stopper.

The following detailed description and accompanying drawings provide a better understanding of the nature and advantages of the present disclosure.

BRIEF DESCRIPTION OF THE DRAWINGS

FIG. 6A-B illustrate the movement of the stopper in relation to the sawtooth forms on the ridge of the cap according to one embodiment.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
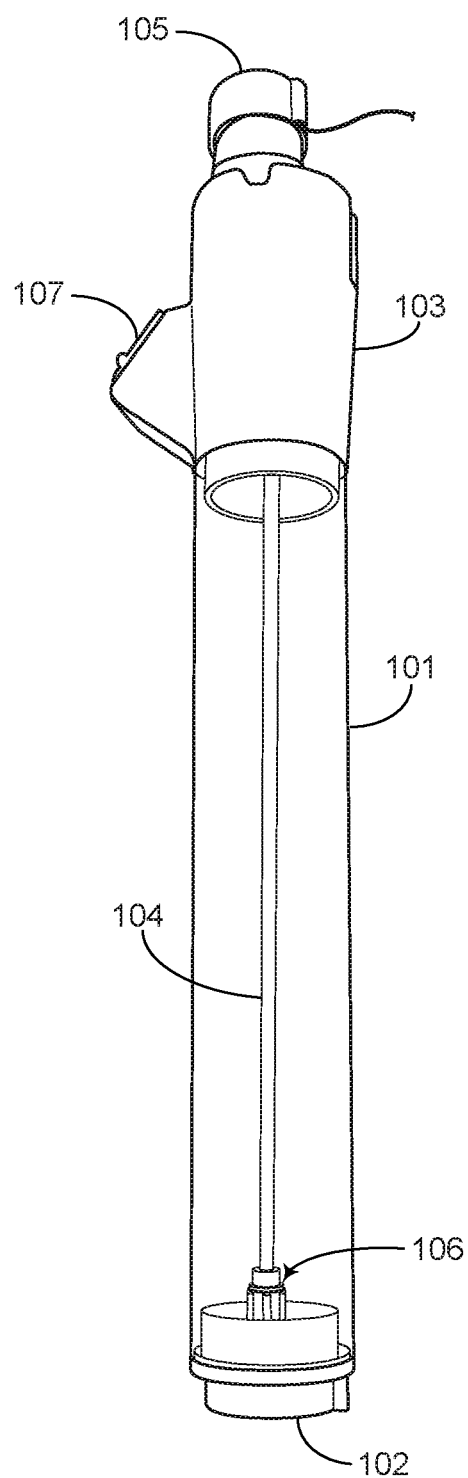
FIG. 1 illustrates a granule dispenser apparatus according to one embodiment.

FIG. 1 illustrates a granular dispenser apparatus according to one embodiment. In this example, the apparatus includes a container 101, a cap 102, a feeder housing 103, a rod 104, a motor 105, and a stopper 106. The cap is coupled to the bottom of the container, and the feeder housing is coupled to the top of the container. The stopper is coupled to the motor via the rod and may be spring loaded against a ridge of the cap. The stopper and the cap may be round (or circular) in shape so that the stopper can rotate around an edge of the cap, for example. As described in the examples below, the stopper and cap may form an interface comprising elements to alternately create seal and openings. The interface may include sawtooth forms and protrusions, where in a first position the protrusions are between the sawtooth forms and the cap and stopper are sealed, and in a second position the protrusions are on top of the sawtooth forms to create openings between the cap and stopper so granular items in the container may flow out of the container, for example. The actual spring (not shown) may be located within the feeder housing, for example. In one embodiment, the motor may be a stepper motor, for example.

Granulated components are placed into the container via a feeder opening 107 of the feeder housing. Example granulated components may include powders or larger granulated items, for example. The container holds the granulated components which will be dispensed. In a home position, the ridge of the cap forms a seal with the stopper, thereby preventing the granulated components from exiting the container from the cap. When the motor is engaged, the rod turns and the stopper is rotated. Protrusions on the surface of the stopper engage sloped portions of a ridge on the cap to form a plurality of openings as described in more detail below. Accordingly, the granulated components in the container pass through the openings.

Figure 2:
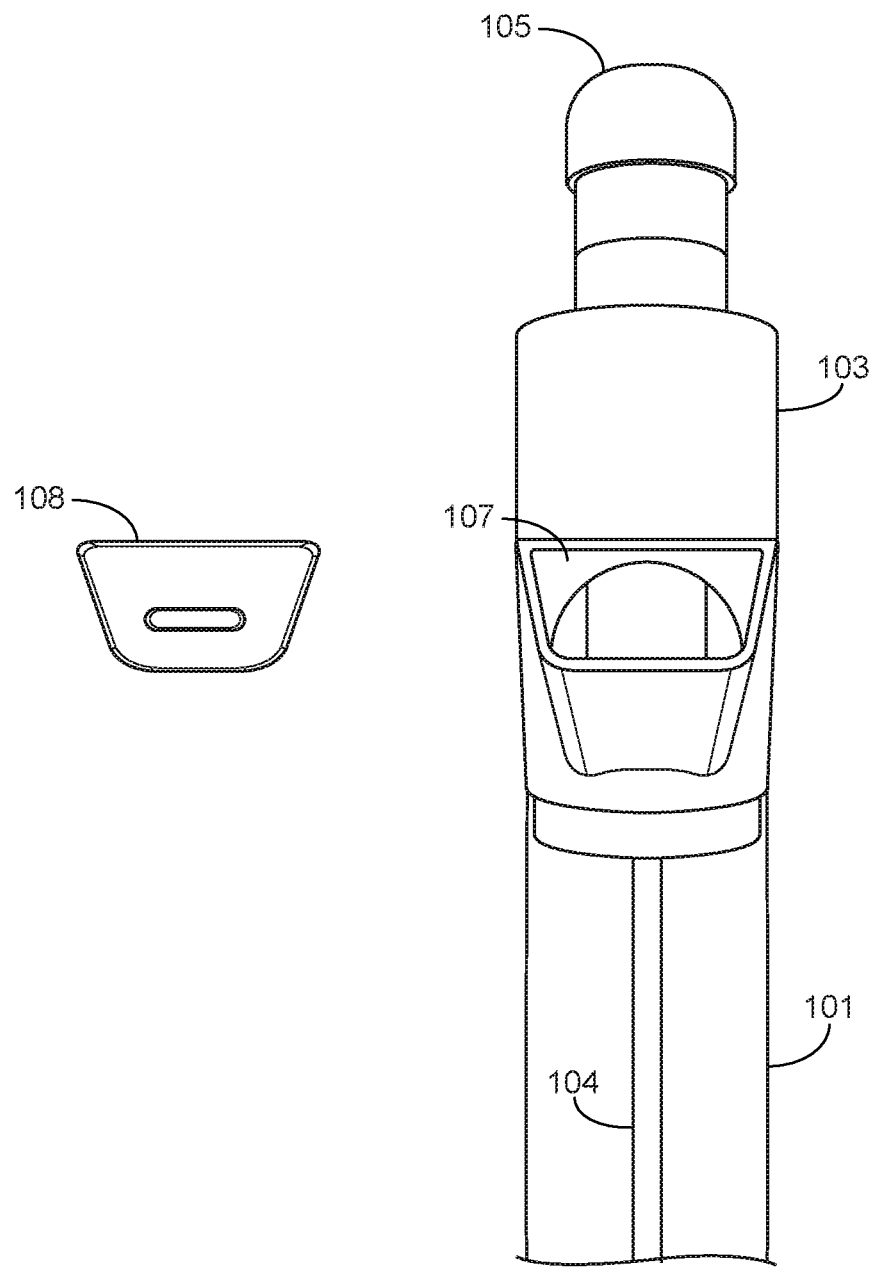
FIG. 2 illustrates an upper section of the granular dispenser according to one embodiment.

FIG. 2 illustrates an upper section of the granular dispenser apparatus of FIG. 1. FIG. 2 shows the feeder housing 103 coupled to the container 101 and the rod 104 extending through the container. The feeder housing includes a feeder opening 107 which allows the granulated components to be fed into the container. A feeder housing includes a top (or lid) 108 to seal the granulated components within the container. The motor 105 is coupled to the feeder housing to hold the motor in place. The rod is coupled to the drive shaft of the motor through the feeder housing.

Figure 3A:
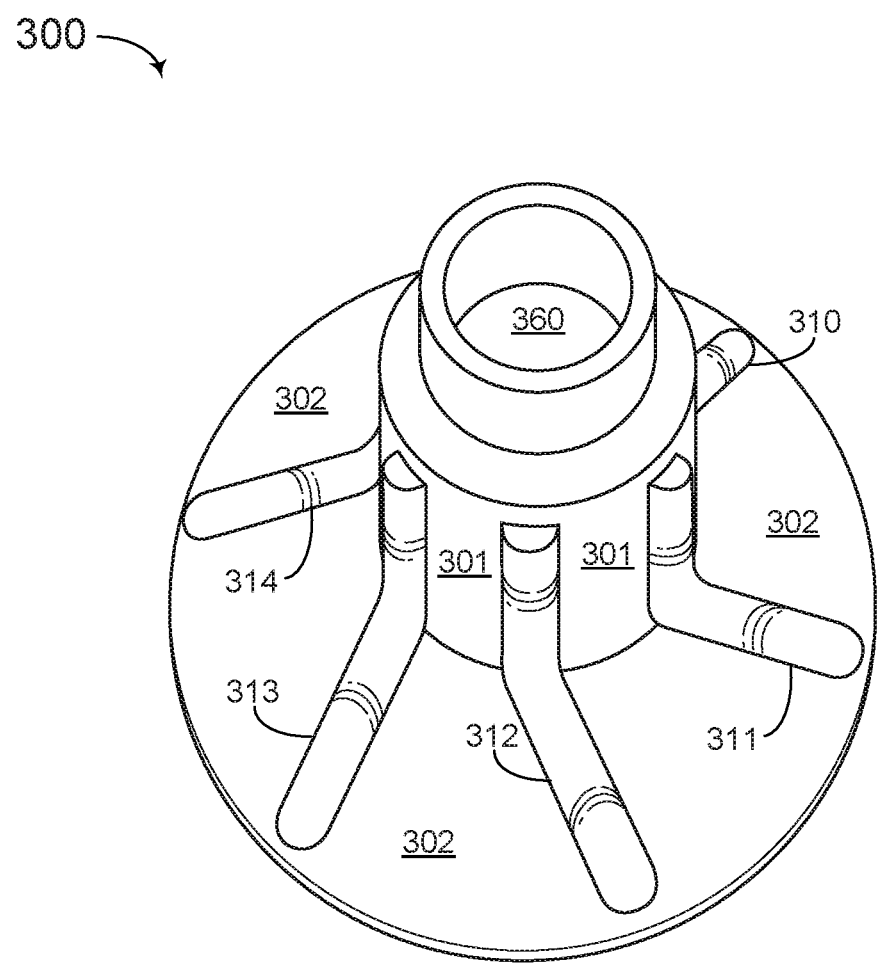
FIGS. 3A-C illustrate an example stopper according to one embodiment.
Figure 3B:
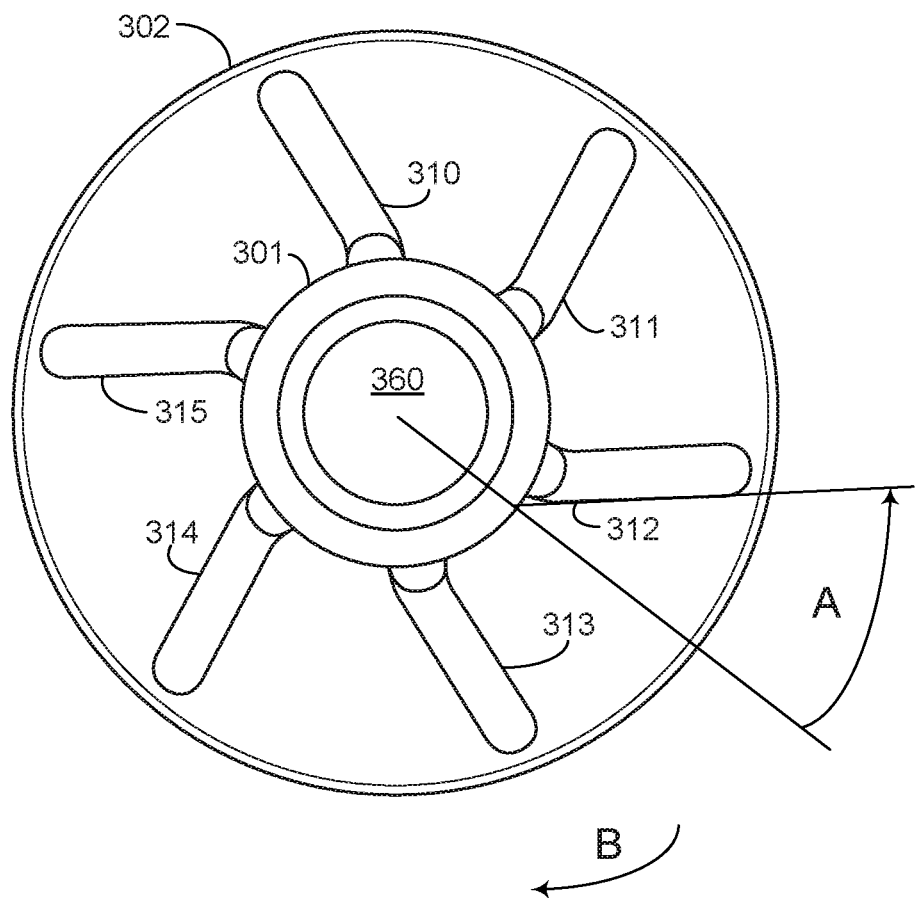
Figure 3C:
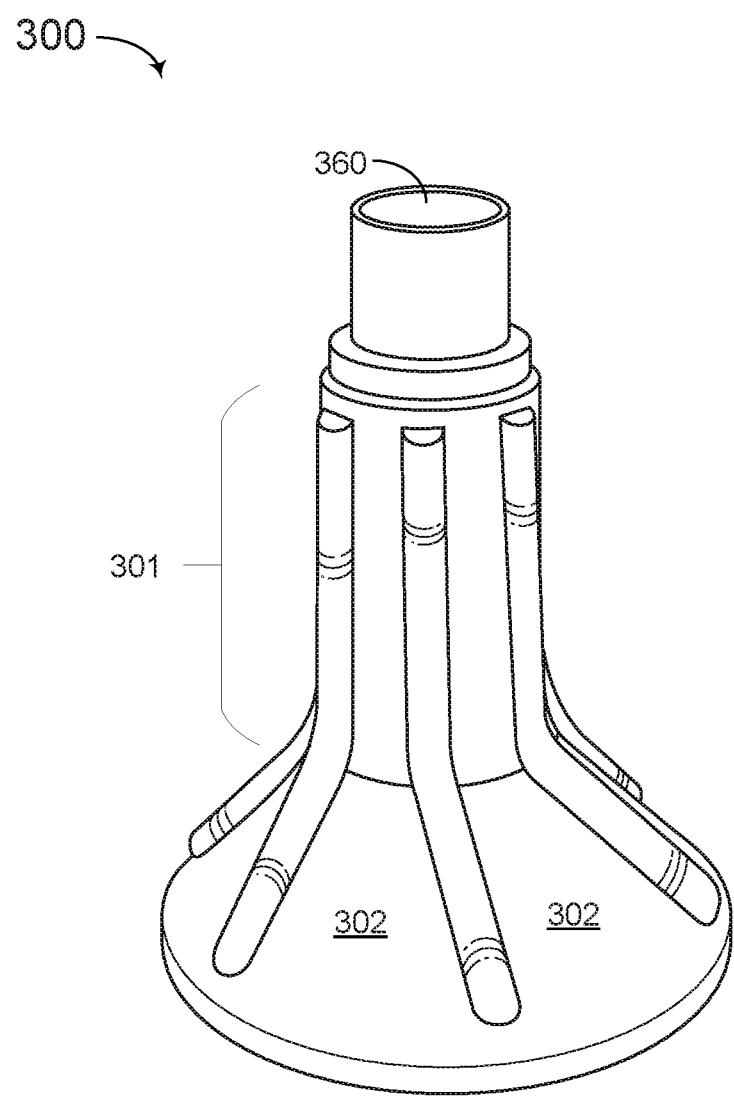

FIGS. 3A-C illustrate an example stopper 300 according to one embodiment. FIG. 3A shows a 3 dimensional view of the stopper. The stopper forms a conical surface comprising a plurality of vertical protrusions (the protrusions are outlined in FIG. 3A). FIG. 3B shows a top view of the example stopper 300. In this example, the stopper has 6 protrusions 310-315 curving from a central elongated portion 301 of the stopper to a lower portion 302. The stopper may be rotated in direction B (e.g., by the motor) to create openings and dispense as the stopper rotates around an edge of the cap. Protrusions 310-315 may be raised above the surface of lower portion 302 to create openings when engaging the cap as described in more detail below. In this example, the protrusions are rounded. Additionally, in one embodiment, the protrusions may bend or curve away from the direction of rotation at an angle A to advantageously create a sweeping effect to move granulated items or powder from the container into the openings, for example. FIG. 3C illustrates another view of the stopper 300 with the protrusions (the protrusions are outlined in FIG. 3C). The stopper includes an upper elongated portion 301 which may be cylindrical or slightly conical, for example. A lower portion 302 of the stopper comprises a conical portion. The lower conical portion 302 includes the conical surface comprising the plurality of vertical protrusions that extend above the conical surface, for example. The sloping aspect of the conical surface may further advantageously help granulated components move toward the edges of the stopper and out through the openings created when the stopper is rotated by the motor, for example. As further illustrated in FIGS. 3A-C, the top of stopper 300 includes a hole 360 for coupling to the rod, for example.

Figure 4A:
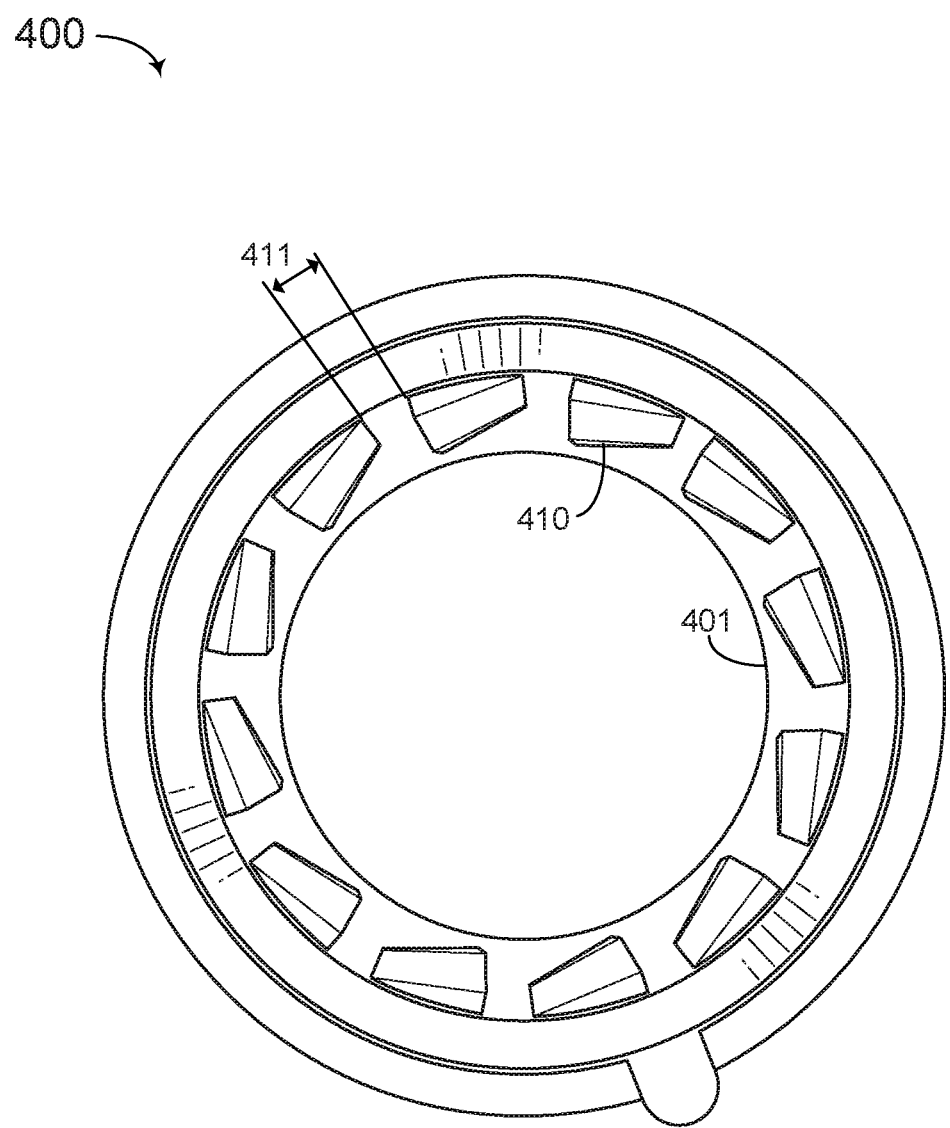
FIG. 4A-B illustrates an example cap according to one embodiment.
Figure 4B:
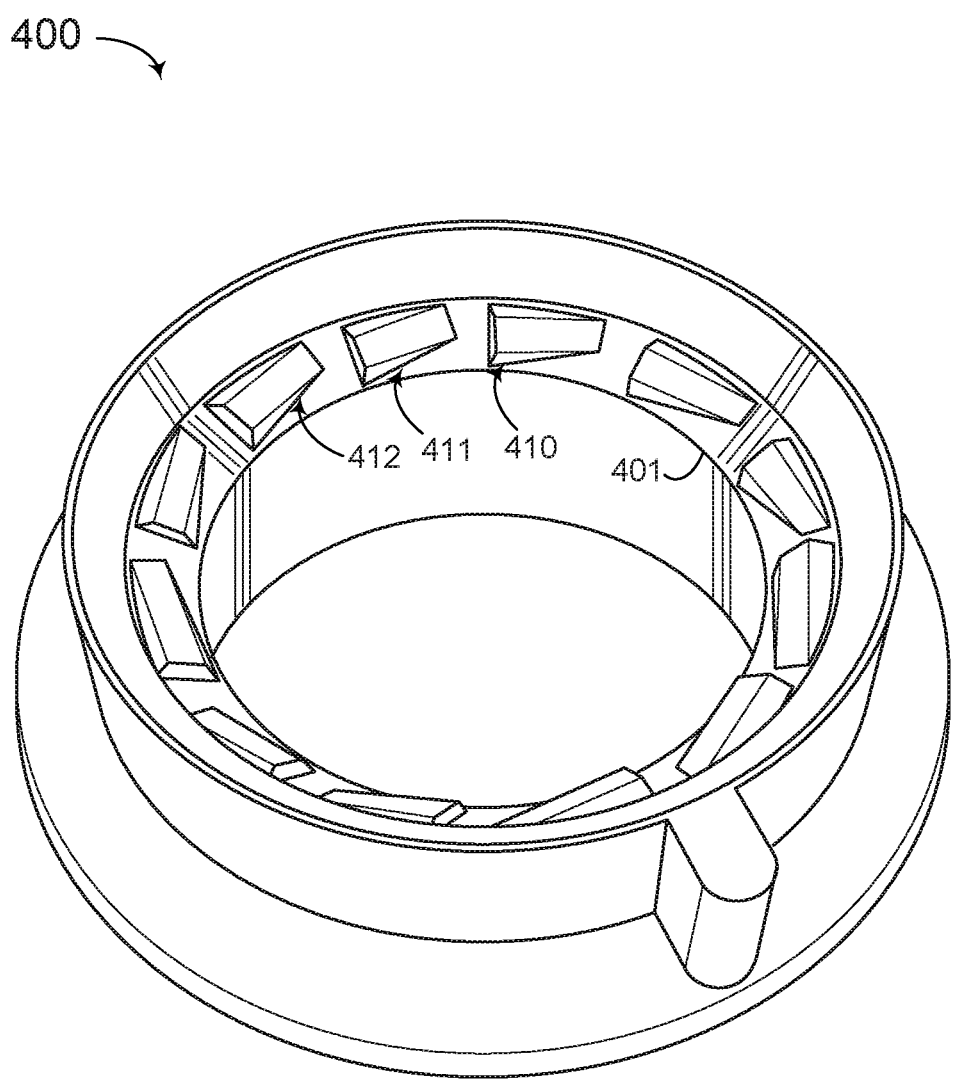

FIG. 4A-B illustrates an example cap 400 according to one embodiment. In this example, a round cap includes a sawtooth ridge. In this example, the sawtooth ridge includes a plurality of sawtooth forms 410 and a plurality of base portions 411 between adjacent sawtooth forms. The vertical protrusions of the stopper (FIG. 3A-C) mate to the base portion of the sawtooth ridge of the cap in a home position to form a seal with the stopper. When the stopper is rotated, the vertical protrusions of the stopper (FIG. 3A-C) engage the sloped portion of the sawtooth forms to produce a plurality of openings. The stopper is lifted away from the ridge 401 of the cap, while being pulled toward the cap ridge by the spring loaded rod, to create openings. The openings may be formed by the protrusions being lifted by the sloped portion of the sawtooth forms to move the conical surface of the stopper away from the cap. The openings reach their maximum size when the protrusions are at the top of the sawtooth forms as further illustrated in FIGS. 6A-B below. Accordingly, the sawtooth forms and protrusions are one example means for alternately forming a seal and one or more openings between the cap and the stopper.

Comparing FIG. 3A-C with FIGS. 4A-B, it can be seen that the number of sawtooth forms on the ridge of the cap and the number of vertical protrusions on the stopper may not be one-to-one. Rather, in this example, there are six (6) vertical protrusions on the stopper and twelve (12) sawtooth forms on the ridge of the cap. As the stopper is rotated, the protrusions cause openings to form between the stopper and the ridge of the cap (e.g., the protrusions and the sawtooth forms lift the stopper away from the ridge of the cap). The sawtooth forms also perform a second function. Every time a protrusion is moved up a sawtooth and then drops back into a base portion, pulled back by the spring loaded rod, a perturbation occurs (i.e., an agitation or vibration), which advantageously prevents or breaks up the granulated components from sticking together or otherwise blocking the flow from the container out through the openings between the stopper and cap. In some embodiments, the protrusions on the stopper may not come in direct contact with the base portions 411, but rather a portion of the stopper surface (e.g., at an edge) is depressed against the lip (or edge) of the cap 400 when the protrusions of the stopper mate with the base portions of the cap, thus sealing the container.

FIG. 4B illustrates the cap of FIG. 4A at another angle. The arrows indicate 3 of the sloped portions 410-412 of the ridge 401. The sawtooth ridge includes a plurality of sloped portions (as outlined) interspersed with a plurality of base portions. As mentioned above, the plurality of protrusions of the stopper (FIG. 3B) may be less than the plurality of base portions of the cap, but the location of the protrusions may match the locations of a set of base portions of the cap in order for the cap to mate uniformly with the stopper when not rotating. In this example, having double the number of sawtooth forms compared to the number of protrusions increases the frequency of agitations. Since the protrusions fit into the base between each sawtooth form (to form a seal between the cap and the stopper and prevent flow), there may be the same number of sawtooth ridges between each of the protrusions, for example. Thus, other embodiments may have fewer or more sawtooth forms between each protrusion (e.g., 1, 3, etc. . . . ), where the number of sawtooth forms between each protrusion corresponds to a frequency of agitation, and the height of the sawtooth forms corresponds to a size of opening created and a strength of agitation.

Figure 5A:
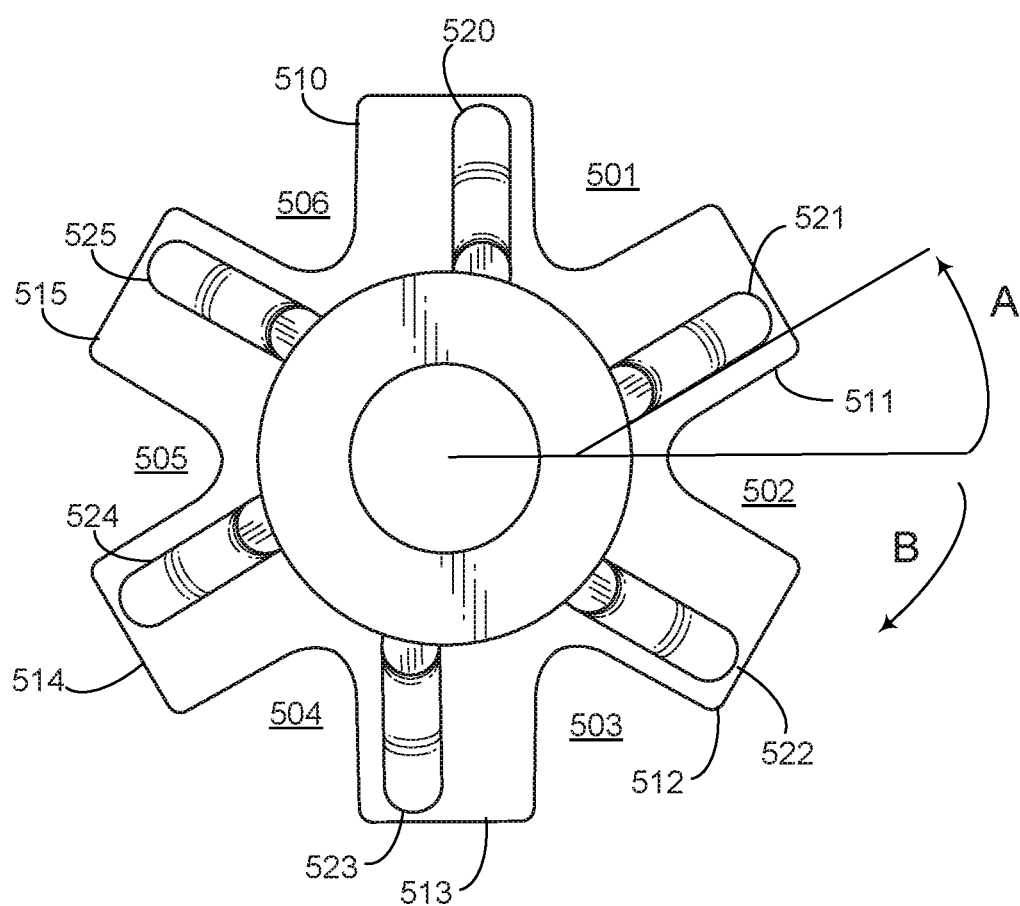
FIG. 5A-B illustrate another example stopper according to another embodiment.
Figure 5B:
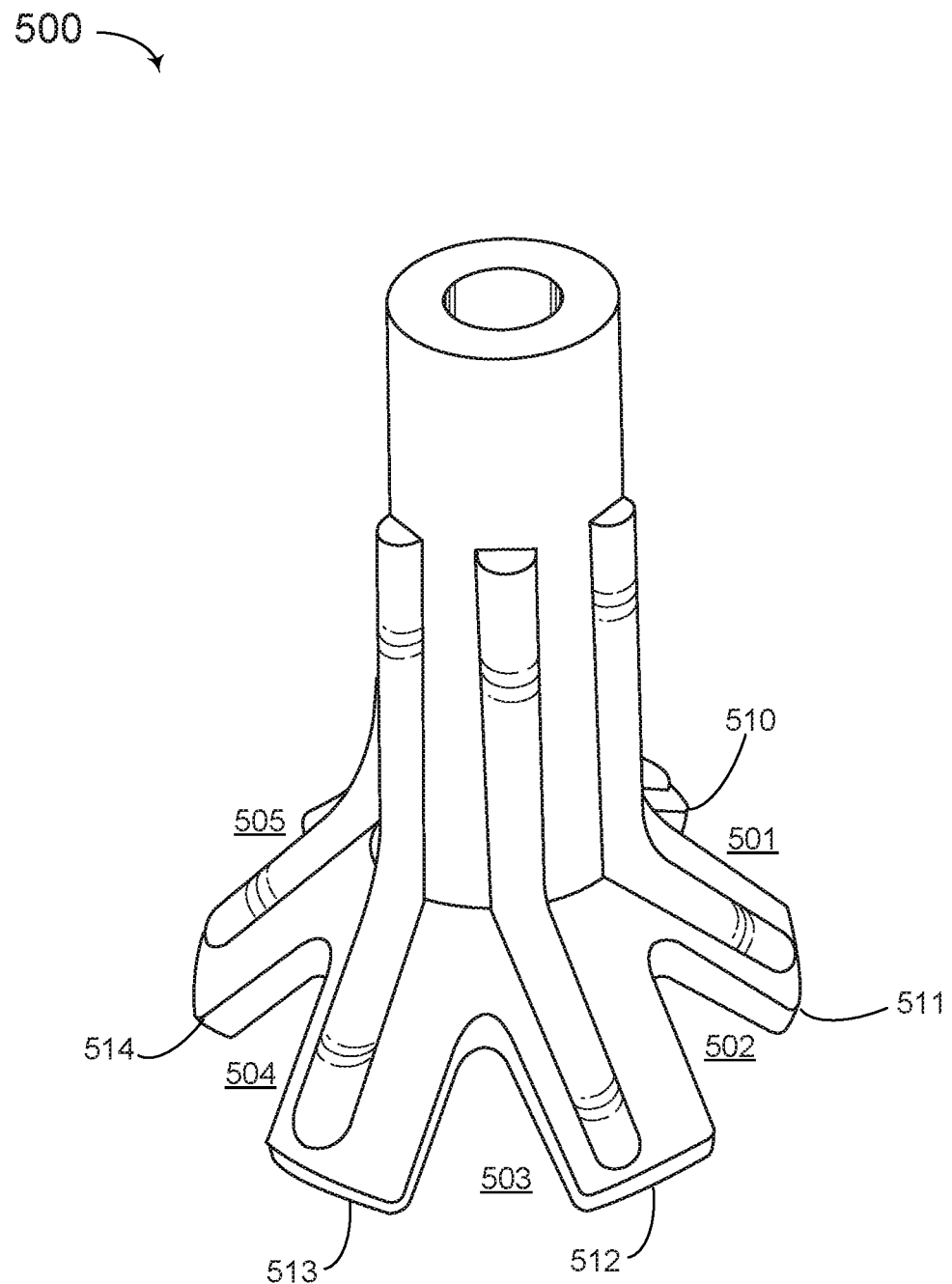

FIG. 5A-B illustrate another example stopper 500 according to another embodiment. FIG. 5A illustrates a top view of the stopper. The stopper 500 includes an elongated portion and a conical portion. The conical portion includes a conical surface broken up by gaps 501-506 between six fingers 510-516 each having protrusions 520-526 arranged at an angle in a direction (veering) away from the direction (B) of rotation as described for the stopper in FIG. 3B. FIG. 5B illustrates a 3-dimensional view of the stopper 500. The stopper has gap openings 501-506 between the fingers 510-516. The protrusions may be more pronounced than the stopper of FIG. 3A-C. The more pronounced protrusions increase the size of the openings when the protrusions move up the slope of the sawtooth forms on the ridge of the cap, for example. The gaps in the conical surface may also help to increase flow. For example, the larger the gap, higher the volume/flow rate and easier it is to dispense sticky powders (which tend to be fine powders) or substances with larger granularities.

FIG. 6A-B illustrate the movement of the stopper in relation to the sawtooth forms on the ridge of the cap according to one embodiment. The sawtooth ridge includes the sawtooth (e.g., a ramp) and base portions. FIG. 6A illustrates a linear depiction of the stopper in relation to the sawtooth ridge in which the protrusion is mated with the base portion of the sawtooth ridge. When rotated, the stopper will move the protrusion in direction (B). FIG. 6B illustrates a linear depiction of the stopper in relation to the sawtooth after the stopper has been rotated and the protrusion has moved in direction (B). As a result the protrusion has been pushed up the ramp of the sawtooth and the stopper has separated from the cap by a distance (C). This distance (C) may cause a plurality of openings to form between the protrusions and allow the granular items to exit the container. In another embodiment, the protrusion does not come in direct contact with the base portion, but rather a lip (or edge) of the stopper is depressed against a lip (or edge) of the cap when the protrusions of the stopper mate with the base portions of the cap.

Accordingly, in one embodiment, the angle of rotation of the stopper controls an amount of the granulated components that pass through the openings. For example, a 90 degree rotation of the stopper may result in a first amount of granulated components to be dispensed, while a 360 degree rotation of the cap may result in a second larger amount of granulated components to be dispensed, for example. As mentioned above, the dispenser apparatus further comprises a motor coupled to the stopper for rotating the stopper. The motor may be configured to rotate a predetermined amount to dispense a corresponding amount of ingredients, for example.

In one embodiment, protrusions extend along a length of the conical surface along an upper portion of the stopper, and wherein the protrusions curve along a lower portion of the stopper. In another embodiment, the protrusions curve in a direction opposite to the direction of rotation to guide the granulated components through the openings. The curve of the protrusions may occur at the intersection of the upper portion and a conical portion as illustrated in FIGS. 3A-C and 4B-C, for example.

In one embodiment, the granulated components are granulated food items. Example granulated food items may include powders (e.g., protein powders or other powdered food supplements), seeds (e.g., Chia seeds), and a wide range of other granulated food products, for example.

In another embodiment, the size of the vertical protrusions and the size of the sawtooth ridge may be different for different items. Larger items with larger granularities may have a larger sized vertical protrusions and/or larger sized sawtooth ridge, for example, than smaller items having smaller vertical protrusions and a smaller sized sawtooth ridge, for example.

In yet another embodiment, the motor is a direct current (DC) motor and an ON time of the DC motor corresponds to an amount of the granulated components that pass through the openings.

In one embodiment, a periodic closing of the stopper vibrates the granulated components within the container, which advantageously prevents granulated components from sticking together or getting jammed and facilitates a steady flow of ingredients, for example. As mentioned above, the height of the sawtooth, the height of the protrusions from the conical surface, and/or the strength of the spring may contribute to the impact of the stopper closing onto the cap, and thereby govern the amount of vibration or agitation, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An apparatus comprising:
a container for holding granulated components;
a cap coupled to a bottom of said container; and
a stopper, said stopper spring loaded against said cap,
wherein an interface between the stopper and the cap comprises a plurality of protrusions and a plurality of sawtooth forms, wherein the protrusions mate to a base portion between the sawtooth forms in a first position to form a seal between the cap and the stopper, and wherein, when the stopper is rotated, the protrusions engage a sloped portion of the sawtooth forms to create a plurality of openings between the cap and the stopper.

2. The apparatus of claim 1 wherein the cap comprises a sawtooth ridge including the sawtooth forms, and wherein said stopper forms a conical surface comprising the plurality of protrusions.

3. The apparatus of claim 2 wherein the openings are formed by the protrusions between a sloped portion of the sawtooth ridge and the conical surface of the stopper.

4. The apparatus of claim 1 wherein an angle of rotation of the stopper controls an amount of the granulated components that pass through the openings.

5. The apparatus of claim 1 further comprising a motor coupled to the stopper for rotating the stopper.

6. The apparatus of claim 5 wherein the motor is a stepper motor.

7. The apparatus of claim 5 wherein the motor is a DC motor and an ON time of the DC motor corresponds to an amount of the granulated components that pass through the openings.

8. The apparatus of claim 1 wherein the protrusions extend along a length of the conical surface along an upper portion of the stopper, and wherein the protrusions curve along a lower portion of the stopper.

9. The apparatus of claim 1 wherein the protrusions are configured on a conical surface of the stopper at an angle opposite to a direction of rotation of the stopper.

10. The apparatus of claim 1 wherein the granulated components are granulated food items.

11. The apparatus of claim 1 wherein the granulated components are powdered food items.

12. The apparatus of claim 1 wherein, during rotation, a periodic closing of the stopper creates an agitation.

13. The apparatus of claim 1 wherein a portion of the stopper engaging the cap comprises fingers having gaps between the fingers, wherein the protrusions extend down the fingers.

14. An apparatus comprising:
a container to hold granulated components;
a cap coupled to a bottom of said container;
a stopper, said stopper spring loaded against the said cap; and
first means for alternately forming a seal and one and more openings between the cap and the stopper,
wherein granulated components in the container pass through the one or more opening,
wherein the first means for alternately forming a seal and one or more openings comprises a sawtooth,
wherein the sawtooth is configured on the cap.

15. An apparatus comprising:
a container to hold granulated components;
a cap coupled to a bottom of said container;
a stopper, said stopper spring loaded against the said cap; and
first means for alternately forming a seal and one and more openings between the cap and the stopper,
wherein granulated components in the container pass through the one or more openings,
wherein the first means for alternately forming a seal or one or more openings comprises a plurality of protrusions, and
wherein the protrusions are configured on the stopper.

16. A method comprising:
storing granulated components in a container, the container comprising a cap coupled to a bottom of said container and a stopper, said stopper spring loaded against the said cap, wherein said stopper and cap form an interface comprising a plurality of protrusions and a plurality of sawtooth forms, wherein, in a first position, the protrusions mate to a base portion between the sawtooth forms to form a seal with the stopper; and
rotating the stopper such that the protrusions engage a sloped portion of the sawtooth forms to create a plurality of openings, wherein granulated components in the container pass through the openings.

\* \* \* \* \*